(12) United States Patent
Jin et al.

(10) Patent No.: US 6,757,101 B2
(45) Date of Patent: Jun. 29, 2004

(54) NONE-MECHANICAL DUAL STAGE OPTICAL SWITCHES

(75) Inventors: Guanghai Jin, Boxborough, MA (US); Jing Zhao, Arbor, MA (US)

(73) Assignee: Agiltron, Inc., Wilmington, MA (US)

( * ) Notice: Subject to any disclaimer, the term of this patent is extended or adjusted under 35 U.S.C. 154(b) by 262 days.

(21) Appl. No.: 09/971,285

(22) Filed: Oct. 5, 2001

(65) Prior Publication Data

US 2003/0068112 A1 Apr. 10, 2003

(51) Int. Cl.[7] .................................................. G02B 5/30
(52) U.S. Cl. ..................... 359/484; 359/280; 359/281; 359/315; 359/320; 359/487; 359/494; 359/495; 359/496; 359/497; 359/499; 372/703; 385/11; 385/33
(58) Field of Search .............................. 359/280, 281, 359/315, 320, 484, 487, 494–497, 499; 372/703; 385/11, 33

(56) References Cited

U.S. PATENT DOCUMENTS

| | | | |
|---|---|---|---|
| 4,355,864 A | 10/1982 | Soref | |
| 4,969,720 A | 11/1990 | Lins | |
| 5,402,509 A | * 3/1995 | Fukushima | .................. 385/33 |
| 5,627,924 A | 5/1997 | Jin et al. | |
| 5,724,165 A | * 3/1998 | Wu | .............................. 359/117 |
| 5,923,472 A | 7/1999 | Bergmann et al. | |
| 5,930,039 A | * 7/1999 | Li et al. | ...................... 359/484 |
| 5,933,269 A | 8/1999 | Robinson | |
| 5,982,539 A | 11/1999 | Shirasaki et al. | |
| 6,014,244 A | * 1/2000 | Chang | ........................ 359/281 |
| 6,134,031 A | 10/2000 | Nishi et al. | |
| 6,173,092 B1 | 1/2001 | Bergman | |
| 6,577,430 B1 | * 6/2003 | Jin et al. | ..................... 359/280 |

FOREIGN PATENT DOCUMENTS

WO    WO 200060405 A1 * 10/2000    ............. G02F/1/09

* cited by examiner

*Primary Examiner*—Thong Nguyen
*Assistant Examiner*—Craig Curtis
(74) *Attorney, Agent, or Firm*—Lumen IPS.; Ron Jacobs; Marek Alboszta

(57) ABSTRACT

The present invention provides improved optical switches in which no mechanical movement is required to direct optical pathways between plural fiber ports. Advantageously, the inventive switches incorporate two-stage polarization rotation to improve isolation depth, as well as temperature and wavelength independence. The inventive switches also incorporate light bending devices to allow two fibers to be coupled to the light beams using a single lens achieving small beam separation for compactness. In the inventive switch, an optical signal is spatially split into two polarized beams by a birefringent element, which passes through a polarization rotation device that comprises waveplates, walk-off elements, and electrically controllable polarization rotators, and recombine into an output fiber, achieving polarization independent operation. The switches of the present invention rely on electro-magnetically or electro-optically switching the beam polarizations from one state to another to rapidly direct the light path.

20 Claims, 8 Drawing Sheets

(a): Top view

NONE-MECHANICAL DUAL STAGE OPTICAL SWITCHES

CROSS REFERENCE TO RELATED APPLICATION

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention is related to optical devices; more particularly, the invention relates to non-mechanical optical switches.

2. Description of Related Art

Optical switch is a device for directing optical signals along selected fibers of an optical network, in which light signals are transmitted along optical fibers to transfer information from one location to another. The desirable optical switch performance include: high speed switching, noneblocking operation, low optical insertion loss, long operation lifetime, small size, and low cost. Optical switch is a key component in today's optical network, analogous to the electrical switches in electrical networks. However, it has not been widely adopted because the lack of reliability and the high cost associated with optical switches.

In an optical switch, light signal must be accurately entered into an optical fiber, or much of the signal strength will be lost. The alignment requirements of modern single mode optical fibers are particularly stringent, as their core diameters are typically as small as 2 to 10 micrometers and their acceptance angle is fairly narrow. Additional insertion losses reduce the amplitude of the optical signal. Therefore, optical switches which accept light from an input optical fiber, and which selectively couple that light to any of a plurality of output optical fibers must transfer that light with precise alignment and within the small acceptance angle for light to efficiently enter the fiber. Most prior art optical switches are based on mechanical movement to switch light beams, consequently have drawbacks of slow and less reliable. It is greatly desirable to have optical switches that direct light beams without moving parts, a feature generally associated with high reliability and high speed.

Many types of alternative none-mechanical optical switches have been developed for commercial applications, such as thermal heating, electro-optic phase retardation, and magneto-optic polarization rotator. These devices use various materials and configurations. Thermal heating based switches typically rely on long interaction planar waveguide construction (for example U.S. Pat. No. 5,892,863). This type of switch has a deficiency of large insertion loss due to fiber to planar waveguide coupling and poor isolation due to heat leak. On the other hand, micro-optic assembly generally provides low optical loss. Micro-optic switches of no-moving parts have been described in several patents, as referenced in this disclosure. However, due to their complex configurations, previous non-mechanical optical switches suffer from high insertion loss and high cost. Further, these switches often comprise many elements and require extremely stringent alignment that is unsuitable for low-cost manufacture. Therefore, non-mechanical optical switches have not been widely used in optical communications. Moreover, all known magneto-optic switch designs are limited to transmit light only in one direction. This deficiency hampers their applications in today's optical networks, which are often bi-directional.

An early concept of a magneto-optic crystal based optical switch for telecommunication use was disclosed by Jin, U.S. Pat. No. 5,627,924. In Jin's switch, the optical beams from the two ports on the same side propagate desirably parallel but with a relative large spatial location shift. Consequently, this design requires three individual imaging lenses, or three fiber collimators. A fiber collimator is a component consists a collimating lens packaged together with light guiding fibers. Because of the large beam separations between the two adjacent lenses, the design requires large and long crystals to deflect the beams. As a result, the optical device has excessively large size and is expensive to produce. The switch is also a single stage device, having low isolation.

A similar two stage optical switch was also disclosed by Wu, U.S. Pat. No. 5,724,165. Wu's switch is disadvantageously based a large spatial separation between two fibers location on the same side. Consequently, the configuration requires individual imaging lens for each fiber port and large and long crystals to deflect the beams. Therefore, the optical device typically has large loss, excessively large size, and is expensive to produce. Moreover, the use of liquid crystal materials leads to undesirable properties of slow speed and large temperature dependence.

Recent magneto-optic switch version as described by Shirasaki, U.S. Pat. No. 5,982,539 represents some improvement by using dual fiber sharing a single imaging lens to reduce the optical device size. However, Shirasaki's switch has a disadvantage that the beam propagations are no long parallel rather with an angle. Consequently the switch requires precise fabrication of complex polarization prisms and matching birefringent wedges. This switch also requires delicacy for maintaining accurate alignment of each optical path, in which the angular and the spatial positions are closely interrelated. Therefore, manufacturing of Shirasaki switch is difficult and consequently the production cost is very high. Shirasaki switch is also a non-reciprocal device, which is unsuitable for bi-directional communication applications.

Recent switches as described by Bergman, U.S. Pat. No. 5,923,472 and U.S. Pat. No. 6,173,092B1 and Robinson, U.S. Pat. No. 5,933,269 utilize mirrors to reflect the beam back to another port on the same side. With a long and fold beam propagation and an unsymmetrical geometry, the devices become less tolerance to both extremely small angle and position misalignment. This type of switch is therefore often very difficult and costly to make. Moreover, the design is a non-reciprocal device.

For the above reasons, what is needed is a system and method for providing non-mechanical optical switches that is amenable to low-cost volume production. It would be particularly desirable to provide optical switches having low optical insertion loss and high speed switching that is also reliable. Its is also important that these switches use less components of small size and require reduced alignment steps with large assembly tolerance to facilitate low cost manufacture. Bi-directional operation is also a desirable feature for many applications.

SUMMARY OF THE INVENTION

It is an object of the present invention to provide a compact and economical non-mechanical optical switch that can be efficiently coupled to optical fibers using fewer parts and having large assembly tolerance. The invention consists of optical switches having at least three ports for optical fibers. The inventive switches use at least one single lens to coupling two fibers achieving small beam separation thus small size and low material cost. The invention further consists of a light-bending device, situated to compensate for the angle between the two light beams that share the same lens, advantageously increasing alignment tolerance.

BRIEF DESCRIPTION OF THE DRAWINGS

FIGS. 2A and 2B are top view and side view of the inventive switch, respectively. FIG. 2C depicts the polarization after each component as the optical signal travels along the two optical paths, in accordance with the invention.

FIGS. 4A and 4C are a top view and side view of the inventive switch using two crystal based prisms, respectively. FIGS. 4B and 4C are a top view and side view of the inventive switch using one crystal based prism in combination with one glass based prism.

FIGS. 6A and 6B are top view and side view of the inventive switch, respectively. FIG. 6C depicts the polarization after each component as the optical signal travels along the two optical paths, in accordance with the invention.

FIGS. 7A and 7B are a top view and side view of the inventive switch, respectively. FIG. 7C depicts the polarization after particular components as the optical signal travels along the two optical paths, in accordance with the invention.

DETAILED DESCRIPTION OF THE SPECIFIC EMBODIMENTS

The polarization insensitive solid-state optical switch of this invention has several advantages over prior non-mechanical optical switches. First, the inventive configuration places two fiber ports on the same side to be closely next to each other and to share the same imaging element. Consequently, only one lens is used on each side of the switch, leading to fewer optical elements. The closely spaced beam propagation arrangement reduces the size requirement for each elements thus lower material cost. The design also results in a smaller footprint of the switches. Conventional non-mechanical optical switches have an arrangement wherein each optical port has its own individual imaging element, disadvantageously requiring larger size of each component used in the switches. Second, the design incorporates a beam angle correction system 20 that compensates the angle separation between the two beams from the same imaging lens (dual collimator consisting fiber 2 and fiber 3). The advantage of having an angular tuning element is that it substantially allows to adjust position and angular independently to achieve maximum light coupling. This inventive configuration greatly reduce the packaging difficulty, therefore, is particularly desirable for volume production. The inventive optical switch's increased alignment tolerance further provides substantially improvement in device thermal stability. Third, another advantage of the inventive optical switch accrues because of the inventive switch's symmetrical crystal layout. Consequently, this provides a symmetric beam path for two polarization components from each port, leading to much reduced, or even substantially eliminated, polarization mode dispersion.

In one aspect of the invention, an optical signal may be rapidly and reliably switched between two optical paths. The inventive optical switch may be used in telecommunications systems/sub-systems, such as in WDM's, EDFA's, add-drop multiplexers, dynamic reconfiguration, dispersion compensators, network switches, network protection and restoration, and OTDR's. These and other advantages of the inventive optical switches are elaborated in the specific embodiments now described. The inventive optical switch may also be used in other optical networks, such as sensors, computers and aviation systems, where high speed and reliable switching is required.

Figure 1:
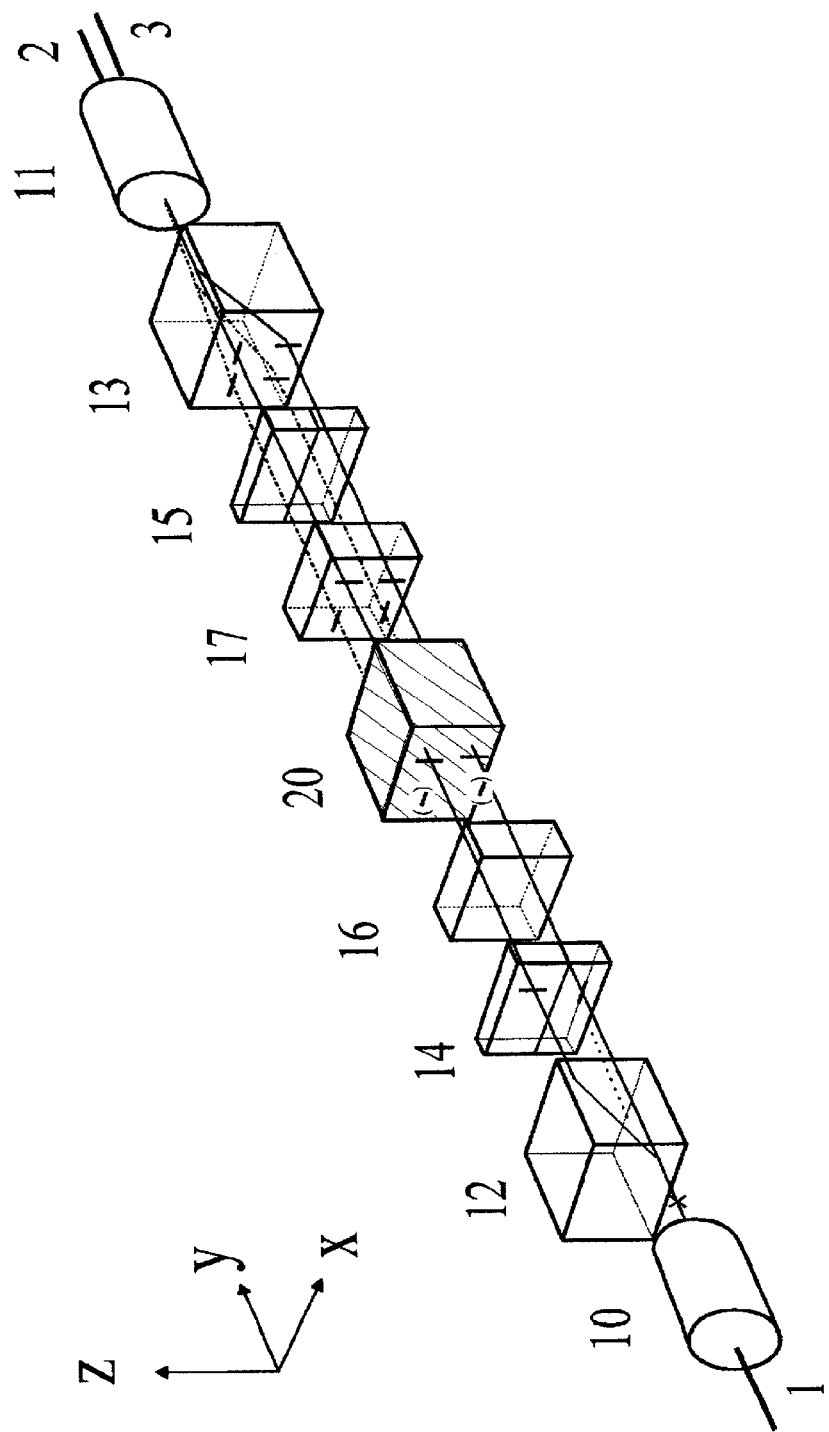
FIG. 1 is a schematic view of a generic three-ports two-stage optical switch according to the principles of the present invention.

FIG. 1 schematically depicts a generic view of a 3 ports inventive non-mechanical optical fiber switch. The invention relates to an optical switch comprising several optical components which are optically coupled along the longitudinal axis: a pair of beam displacer/combiner 12 and 13 that displaces at least one optical beam into two polarized component beams and combines at least two polarized component beams to form an optical beam; a pair of half-aperture halfwave plate 14 and 15, for rotating the polarization of the beams such that both beams have the same polarization state or rotating two parallel polarization beams into orthogonal polarizations; a pair of electrically controllable rotator 16 and 17, for rotating the polarization orientation of the polarized component beams upon an electrical signal to direct beam between two paths; a polarization walk-off and beam angle deflection system 20 which shifts one set of the polarization beam laterally the same distance and deflect all beams with a correction angle such that both optical path are coupled into the dual collimators that have an angular between the two beam propagations. The switch described here is a polarization-rotation based device in which a randomly polarized input light beam is split into a pair of beams of two polarizations; the light beams with a certain state of polarization goes to one fiber but that with another state of polarization goes into another fiber. The electrically controlled polarization rotators switch the state of polarization of the light beams from one to another, consequently switch light from one port to another port yet with little polarization dependence.

The present invention will be further described in terms of several optical switch embodiments having specific components and having specific configurations. However, one of ordinary skill in the art will readily recognize that this method and system will operate effectively for other components having similar properties, other configurations, and other relationships between components.

EXAMPLE 1

Two Stage Bi-directional Magneto-Optic 1×2 Switch

To more particularly illustrate the method and system in accordance with the present invention, refer now to FIGS. 2A, 2B, and 2C, depicting one embodiment of a three ports (1×2) optical switch using a reciprocal 90° Faraday. FIG. 2A depicts a top view of the optical switch and FIG. 2B depicts a side view of the optical switch. FIG. 2C depicts the propagating beams' polarization states as they exit each component. A first optical fiber 1 is inserted into a first glass capillary 10A. Opposite first fiber 1, a second optical fiber 2 is inserted into a second glass capillary 11A and a third optical fiber 3 is inserted into the same glass capillary 11A adjacent to fiber 2, so that fiber 2 and fiber 3 are parallel. Fiber 1 emits a light beam 30 that is collimated by lens 10B. Light beam to or from fiber 2 and fiber 3 are collimated by lens 11B. Lens 11B also causes beam to make an angle θ with respect to the y-axis.

Beam 30 then passes through a first birefringent block 12. Beam 30 is thereby divided into two beams having orthogonal polarizations, specifically beams 30A and 30B; these polarizations are indicated in FIG. 2C. The length of birefringent block 12 is adjusted to obtain a spatial separation between beams 30A and 30B, which permits to pass them through independent optical elements, such as 14. Beam 30A then enters a first halfwave plate 14 which rotates the plane of polarization by 90°, rendering its polarization parallel with beam 30B in the vertical Z direction.

Figure 2:
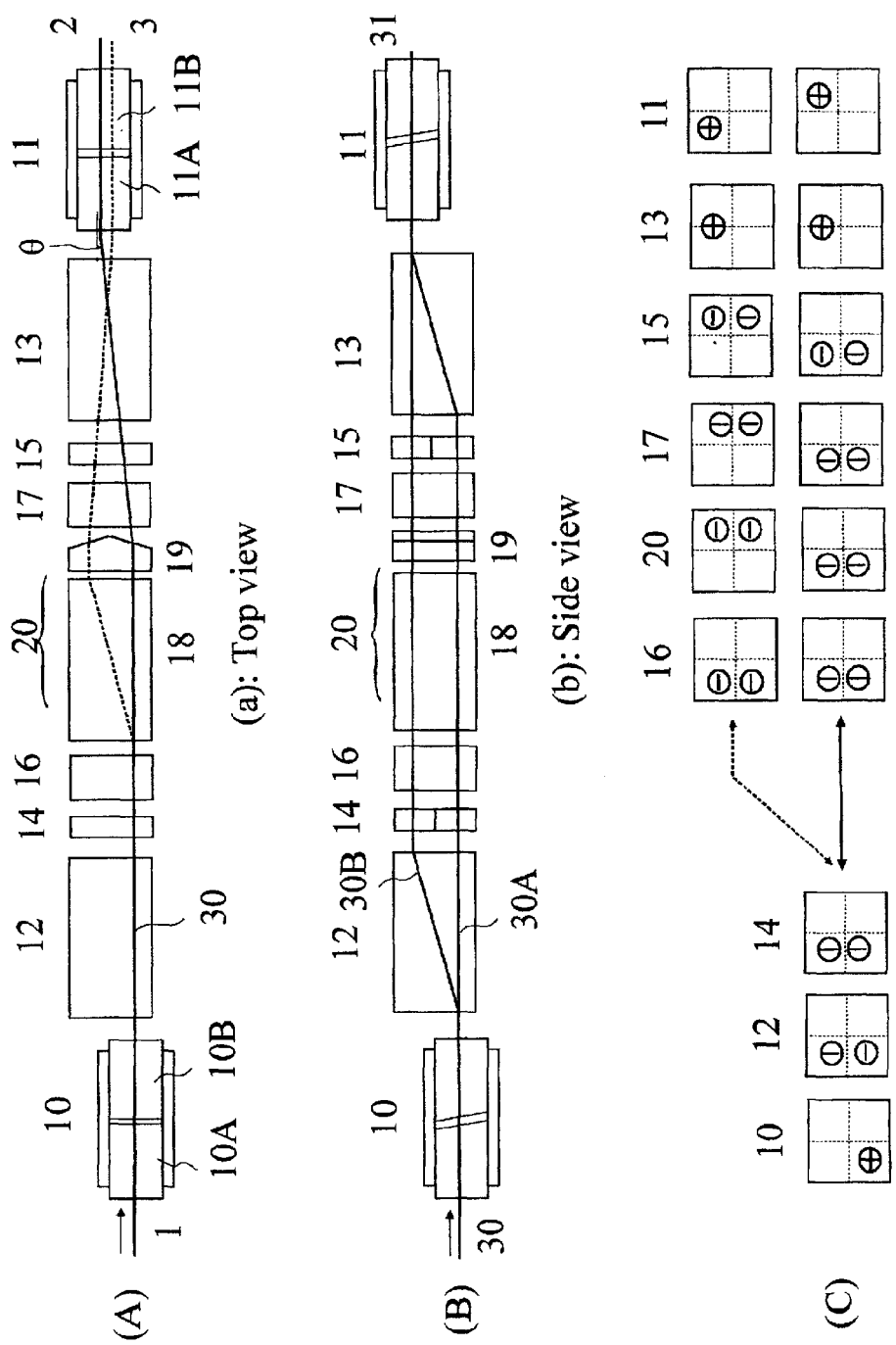
FIG. 2 is a plan view of a specific non-mechanical bi-directional magneto-optic optical switch of FIG. 1, and illustrates the arrangement of each element within the switch body for this embodiment.

Considering a first switching state in which light path is from 1 to 2, as indicated by solid beam propagation line in FIG. 2. In this light path sate, beam 30A and beam 30B enter the first electrically controllable polarization rotator 16 which rotates the plane of polarization by 0°, as seen in the bottom section of FIG. 2C. The beam 30A and 30B then pass a birefringent walk-off element 18 unaltered.

At this point both beams propagate parallel to the longitudinal y-axis which need to be bent at an angle θ with respect to the y-axis in order to be efficiently coupled into fiber 2. A polarization-independent light-bending device 19 corrects this angle of propagation, playing an important role in guiding light from fiber 1 to fiber 2.

Both beam than pass through the second electrically controllable polarization rotator 17 unchanged since 17 rotates the plane of polarization by 0° in this state of operation. Beam 30A enters a halfwave plate 15, which rotates its polarization by 90°. Beams 30A and 30B subsequently pass through a second birefringent block 13, where beam 30A is the extraordinary ray and beam 30B is ordinary. Block 13 combines beams 30A and 30B to form a single beam 31 that is in general unpolarized since it combines the two orthogonal polarizations of beams 30A and 30B. Beam 30 is focused by a second lens 11A and enters optical fiber 2 mounted in glass capillary 11B. Therefore an optical path from fiber port 1 to fiber 2 is established, when zero polarization rotations are applied to both electrically controllable rotators 16 and 17.

Next, considering a second switching state in which light path is from port 1 to port 3, as shown in FIG. 2 by the dotted beam propagation line. Similarly, fiber 1 emits a light beam 30 that is collimated by lens 10B. After passing through birefringent block 12, beam 30 is divided into two orthogonally polarized beams 30A and 30B. Both beams' polarizations are subsequently rendered by halfwave plate 14 to be parallel in the Z direction. Then, the beams enter the first electrically controllable polarization rotator 16, which rotates their polarization by 90° by applying a appropriate control signal. The beam 30A and 30B then pass a birefringent walk-off element 18 and change propagation with a displacement in x-axis. Beams 30A and 30B are then bended at angle 0 with respect to the y-axis by glass prism 19. Both beams' polarizations are subsequently rotated by another 90° by the second electrically controllable rotator 17. Next, beam 30B enters a halfwave plate 15, which rotates its polarization by 90° to render the beams orthogonal to each other. Block 13 subsequently combines beams 30A and 30B to form a single beam that is focused by lens 11B on optical fiber 3. Therefore an optical path from fiber 1 to fiber 3 is established, as 90° rotation control signals are applied to rotators 16 and 17. Two stage polarization rotations result in a desirable performance of higher isolation and less dependence on temperature and wavelength variations.

Figure 3:
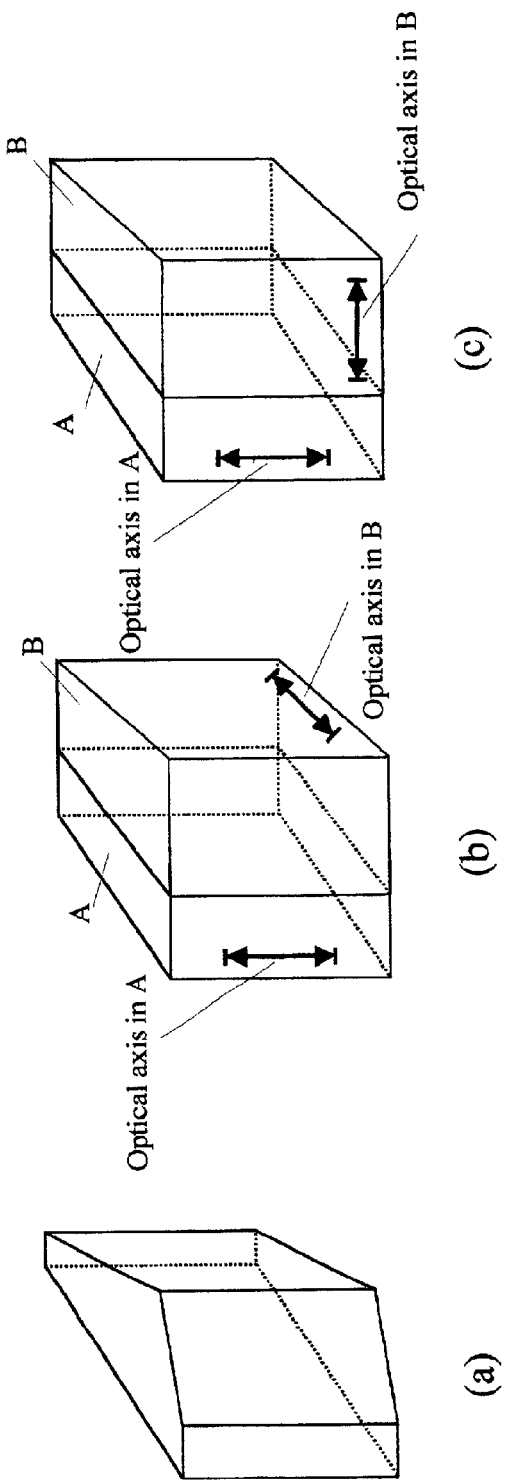
FIG. 3s are three embodiments of beam angle correction prism 18, in accordance with the invention.
FIG. 3A is a structure view of a glass prism.
FIG. 3B is a structure view of a Wollaston prism.
FIG. 3C is a structure view of a Rochon prism.

There are many methods to make light-bending device 19. One embodiment of device 19 consists of a tapered glass prism, whose angle is adjusted so that beams enter from fiber port 2 and 3 are rendered parallel to the y-axis as the beams exit device 19. One specific embodiment of glass prism is illustrated in FIG. 3A. Other shapes and constructions of prisms can also perform the same function. In another embodiment, the light guiding device 19 can be constructed using two tapered birefringent plates 19A and 19B usually from the same birefringent material to change angle of propagation. Two such examples of Wollaston type and Rochon type prisms are depicted in FIG. 3B and FIG. 3C. The tapering of the first plate 19A is complementary to the tapering of the second plate 19B, and each plate is tapered by an angle a. The index of refraction in general determines how much a light ray will bend, or refract, upon entering a material. When the index of refraction is known, the amount of refraction can be determined by Snell's law. The angle α is adjusted so that the beams input from port 2 and port 3 are rendered parallel to the y-axis as them exit form light guiding device 19.

Figure 4:
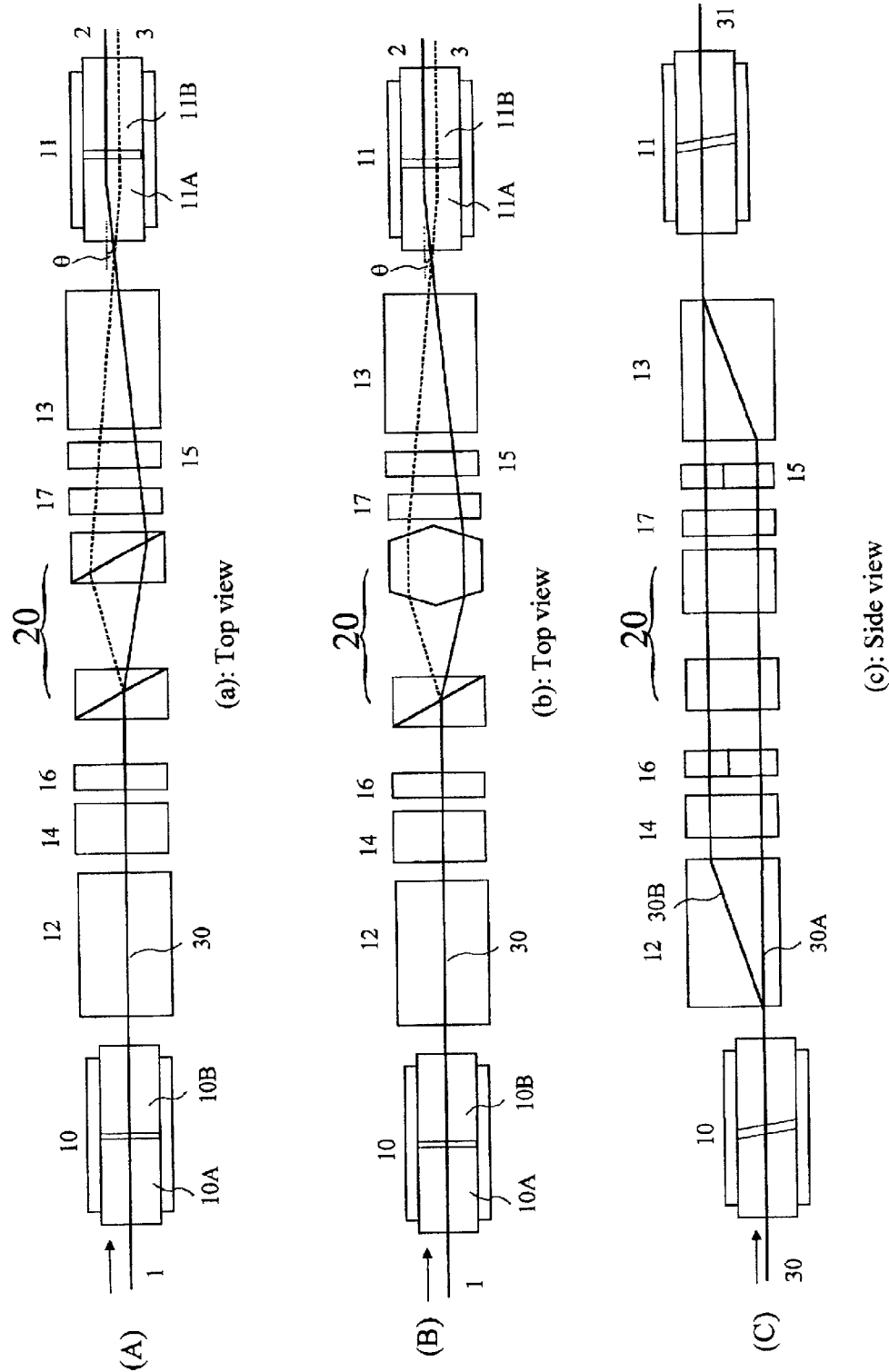
FIG. 4 is a plan view of two other specific non-mechanical optical switches of FIG. 1, and illustrates the arrangements of each element within the switch bodies for both 1×2 embodiments.

Further, with this type of double birefringent plates based element, it is also possible to eliminate walk-off element 18. Two such specific embodiments are illustrated in FIG. 4 to teach the art. An additional Wollaston can replace the walk-off crystal 18 in the above designs as shown in FIG. 4A. The second Wollaston is designed to provide receiving angle from light beam with incident angle from the first Wollaston. A glass prism can replace the second Wollaston also as shown in FIG. 4B. Various other variations of the arrangements can also perform the same function.

Beam splitter 12 and 13 as well as Walk-off element 18 can be made using birefringent crystal or polarization prism. Birefringent elements 12, 18, 13, 19A, and 19B can be made of any birefringent material, such as rutile, calcite, or yttrium orthovanadate.

Figure 5:
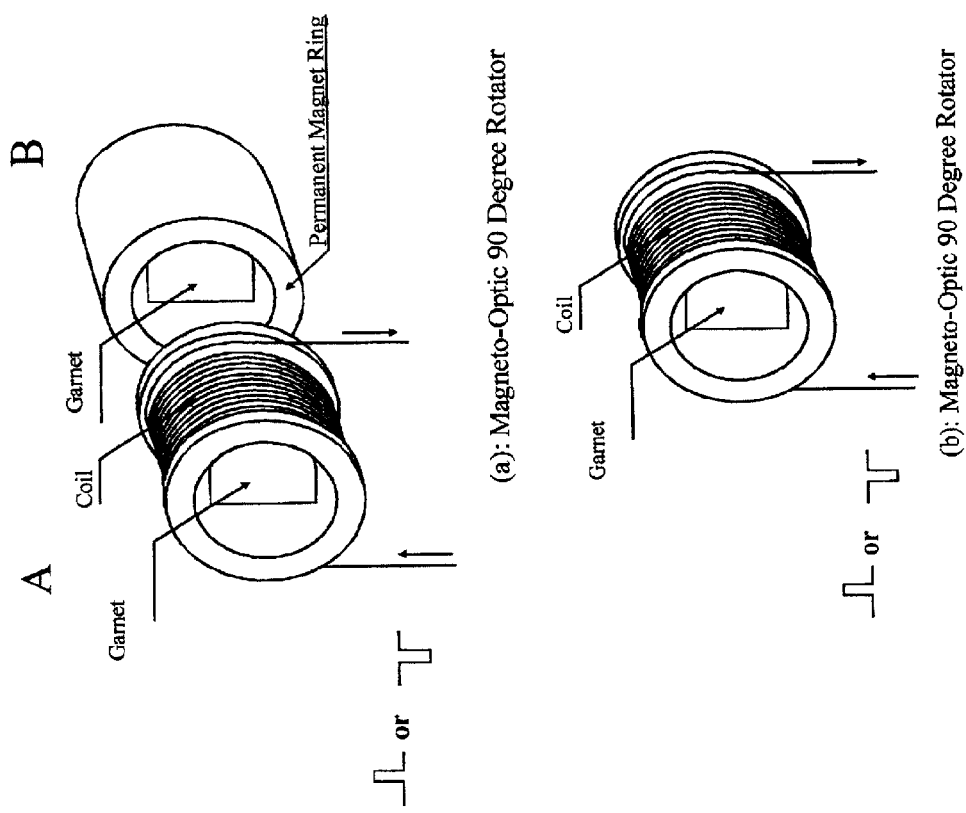
FIG. 5s are schematic views of two embodiment of the Faraday rotator according to the present invention.
FIG. 5A is a reciprocal Faraday rotator embodiment according to the present invention and FIG. 5B is non-reciprocal Faraday rotator embodiment according to the present invention.

As described in another our pending patent application, one preferable embodiment of electrically controllable polarization rotators 16 and 17 is using magneto-optic Faraday rotators. FIG. 5A schematically depicts a generic view of an inventive reciprocal Faraday rotator that comprises two rotators A and B. The first garnet A is coupled to an electromagnet, forming an electrically controllable thus reversible Faraday rotator. With a proper garnet thickness, this element rotates the polarization of passing light by 45° clockwise or counterclockwise, respectively, by changing the polarity of the applied control current. The second Faraday rotator B comprises either a latched garnet or a garnet that is field saturated by a permanent magnet with the magnetic field parallel to the light beam. Faraday rotator B permanently rotates the light beam polarization by 45° of a fixed direction. Therefore, the combined Faraday rotator rotates light polarization between 0° when the two polarization rotations of A and B cancel each other and 90° when the two rotations are in the same direction. Although other optical element could be placed between Faraday rotator A and Faraday rotator B, the net effect of rotating light beam polarization between 0° to 90°, achieved by the inventive Faraday rotator, forms the base for reciprocal magneto-optic devices.

In one embodiment, the Faraday polarization rotator comprises yttrium-iron-garnet (YIG), or Bi-added thick film crystals with a low field of saturation, such as less than 200(Oe) to reduce power consumption. One example of such materials is bismuth-substituted rare earth iron garnet single crystal system represented by a chemical formula $(GdRBi)_3(FeGaAl)_5O_{12}$, where R denotes at least one element selected from the group consisting of yttrium (Y), ytterbium (Yb) and lutetium (Lu). The electro-magnet coupled to Faraday rotator A comprises primarily cupper coils. Ion alloys are often incorporated into the electromagnet to improve electrically induced magnetic field strength. Semi-hard magnetic metallic alloys can be used to achieve latching performance, although this is not essential for self-latching type garnets. Therefore, the inventive switch requires only current pulse to switch optical path from one to another by reversing the polarity and latches to the previous switching state even when the current is removed.

EXAMPLE 2

Two Stage Non-Reciprocal Magneto-Optic 1×2 Switch

Figure 6:
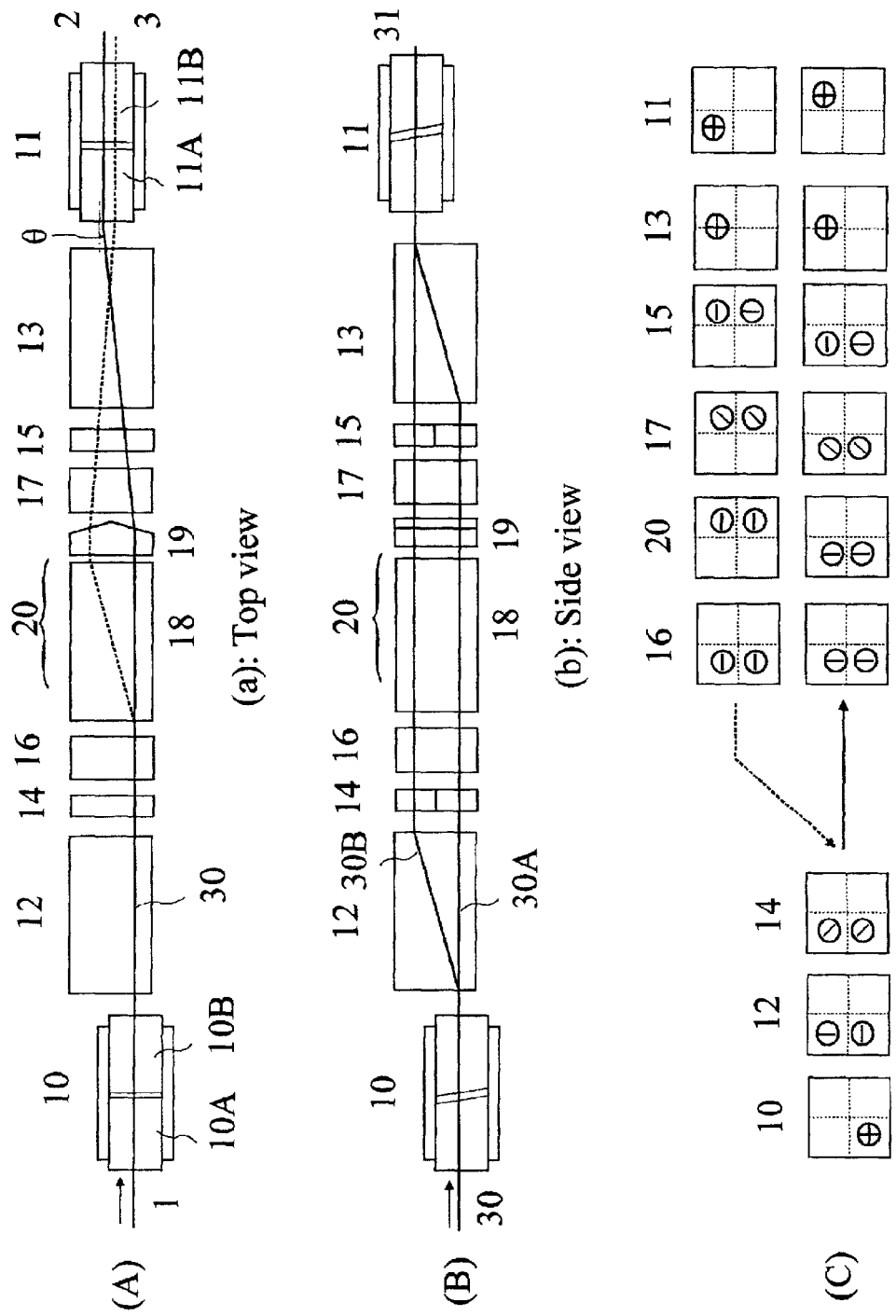
FIG. 6 is a plan view of a specific non-mechanical non-reciprocal magneto-optic optical switch of FIG. 1, and illustrates the arrangement of each element within the switch body for this embodiment.

Another embodiment of the present invention is a three ports (1×2) optical switch using two 45° Faraday rotators. One such electrical controllable Faraday rotator is shown in FIG. 5B. 45° Faraday rotator uses less material than that of 90° Faraday rotator system described above. But this embodiment becomes non-reciprocal rather than reciprocal. FIG. 6 depicts a specific configuration. FIGS. 6A and 6B depicts top and side view of the optical switch, respectively. FIG. 6C depicts the propagating beams' polarization states as they exit each component. Similarly to the above configurations, an input light beam 30 is divided into two beams 30A and 30B of orthogonal polarizations by a first birefringent block 12 and then rotated to be at a 45° to the X-axis by a first halfwave plate 14.

Considering a first switching state in which light path is from 1 to 2. In this light path, both beams' polarizations are rotated by 45° clockwise by the first Faraday rotator 16; both beams then pass a birefringent walk-off element 18 unaltered; Both beams are subsequently bent by an angle θ by light-bending device 19; Both beams' polarizations are again rotated 45° clockwise by pass through the second Faraday rotator 17; Both beams' polarizations are further rotated ±45° respectively, rendering them orthogonal, by the second halfwave plate 15; Both beams are subsequently combined by a second birefringent block 13 and coupled to optical fiber 2. Therefore an optical path from fiber port 1 to fiber 2 is established, when a current pulse that generates 45° clockwise Faraday rotation is applied to both electrically controllable rotators 16 and 17.

Next, considering a second switching state in which light path is from port 1 to port 3. Similarly, the parallel polarized beams 30A and 30B enter the first controllable Faraday rotator 16, which rotates their polarizations by 45° counter-clockwise by applying an appropriate control signal. Both beams' propagations are then displaced along X-direction by walk-off element 18 and bent at an angle θ with respect to the y-axis by glass prism 19. Both beams' polarizations are again rotated by another 45° counter-clockwise by the second Faraday rotator 17. Both beams' polarizations are further rotated ±45° respectively, rendering them orthogonal, by the second halfwave plate 15; Both beams are subsequently combined by passing through the second birefringent block 13 and coupled to optical fiber 3. Therefore an optical path from fiber port 1 to fiber 3 is established, when a current pulse that generates 45° counter-clockwise Faraday rotation is applied to both electrically controllable rotators 16 and 17.

The various methods and specific embodiments to make each component described in Example 1, especially the polarization walk-off and beam angle deflection system 20, are all applicable to this switch embodiment. Many other variations on crystal arrangement can also be used to reconfigure this embodiment in accordance with the present invention.

EXAMPLE 3

Two Stage Electro-Optic 1×2 Switch

Figure 7:
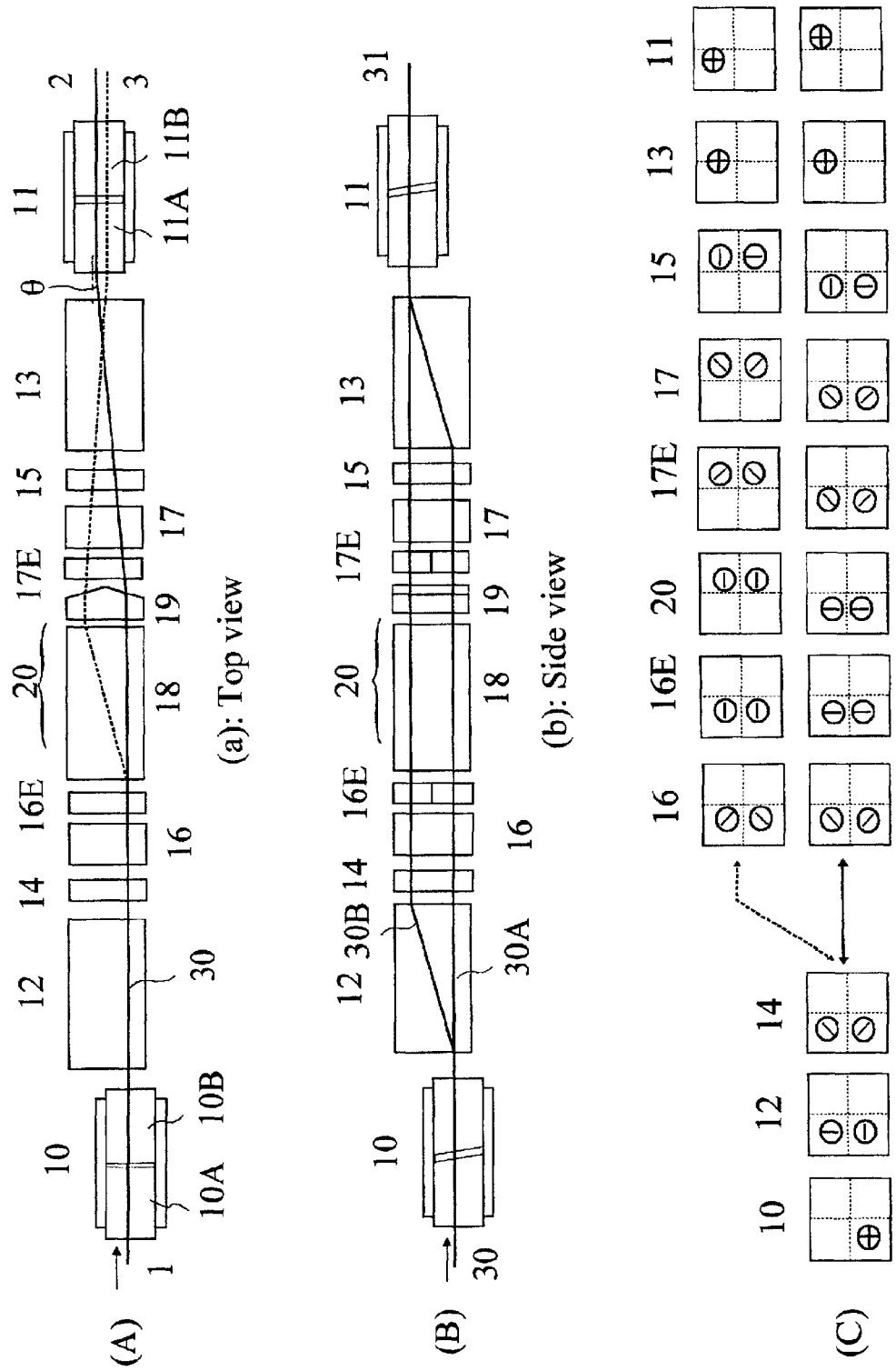
FIG. 7 is a plan view of a non-mechanical electro-optic switch according to the invention, and illustrates the arrangement of each element within the switch body for this 1×2 embodiment.
Figure 8:
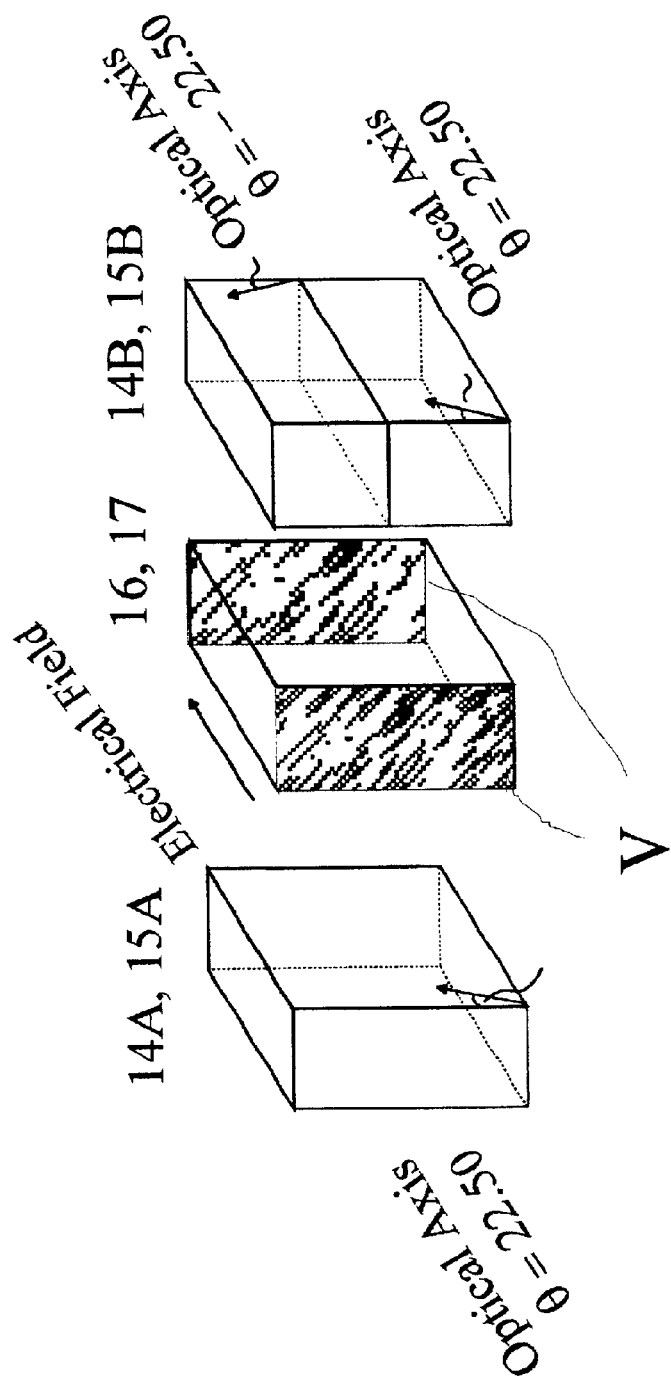
FIG. 8 illustrates one embodiment of the electro-optic rotator and associated waveplates.

The above-described magneto-optic effect based optical switch embodiments can be changed into electro-optic effect based switches. These switch embodiments use an electrically controllable birefringent plate rotating polarization from between 0° and 90°, or −45° to +45° instead of a Faraday polarization rotation plate. The inventive electro-optic switch is a reciprocal device, allowing bi-directional optical communication. One embodiment requires only replacing the Faraday rotator 16 in Example 1 with an electro-optic plate having electrical field applied 45° to the X direction. Other embodiments using electro-optic plates with field applied parallel to the X or Y directions are straightforward modifications to the magneto-optic versions with corresponding changes to the orientations of associated birefringent crystals. One such embodiment is illustrated in FIG. 7 with the corresponding electro-optic rotator and halfwave plate arrangements shown in FIG. 8. In this embodiment each halfwave plate further comprises two elements 14A and 14B or 15A and 15B. The various methods and specific embodiments to make each component described in Example 1, especially the polarization walk-off and beam angle deflection system 20, are all applicable to these electro-optic switch embodiments. Many other variations on crystal, arrangement can also be used to reconfigure this embodiment in accordance with the present invention.

The general requirement for the electro-optic phase retarder used in the inventive switches is that, when a voltage is applied, a polarization rotation of 90° or ±45° is produced. Preferably, the material has a high electro-optic coefficient to reduce operating voltages to less than 500 volts, good thermal stability, and good transparency at the wavelength of interest, e.g., between 1200 nm and 1600 nm. These requirements are satisfied by a class of ferroelectric complex oxides which have a Curie temperature less than about 600° C., so that electro-optic coefficients are high in the operation temperature range. Example material systems are: a solid solution of lead manganese niobate and lead tantalate (PMN-PT) and a solid solution of lead niobate zirconate and lead tantalate (PNZPT), lead manganese niobate (PMN), lanthanum modified PZT (PLZT), and More members of this class may be discovered in the future. It is particularly preferable to use single-crystal of the said class of ferroelectric materials, providing good repeatability and temperature independent operation. Another family of electro-optic materials applicable to the inventive switches is organic materials with large electro-optic effect. Organic electro-optic materials have an advantage of higher switching speed due to their relatively smaller dielectric constant.

The above descriptions of the 1×2 embodiments are very specific examples. It will be apparent to a person of average skill in the art that many variations of the switch are possible within the scope of the invention. Accordingly, the scope of the invention should be determined by the following claims and their legal equivalents.

What is claimed is:

1. An optical switch for establishing an optical path between a first fiber and a second fiber, or between said first fiber and a third fiber, said second fiber and said third fiber being located adjacent to each other along a longitudinal axis and opposite said first fiber along said longitudinal axis, said optical switch comprising along said longitudinal axis in sequence from said first fiber to said second and third fibers:
   a) a first lens;
   b) a first block of birefringent material;
   c) a first compound half-wave plate including two half wave plates disposed in a plane substantially perpendicular to said longitudinal axis;
   d) a first compound polarization rotator including two electrically controllable polarization rotators disposed in a plane substantially perpendicular to said longitudinal axis;
   e) a compound light guiding device, comprising a polarization-dependent beam path deflector and a polarization-independent beam angle corrector, said deflector and said corrector being distinct optical elements;
   f) a second compound polarization rotator including two electrically controllable polarization rotators disposed in a plane substantially perpendicular to said longitudinal axis;
   g) a second compound half-wave plate including two half wave plates disposed in a plane substantially perpendicular to said longitudinal axis;
   h) a second block of birefringent material; and
   i) a second lens for imaging light passing between said second birefringent block and said second or third fibers.

2. The optical switch of claim 1 wherein an angle θ between 1° and 4° is present between said longitudinal axis and an optical beam path between said second block and said second lens.

3. The optical switch of claim 1 wherein said polarization-independent beam angle corrector comprises a glass prism.

4. The optical switch of claim 1 wherein said polarization-dependent beam path deflector comprises two tapered birefringent plates.

5. The optical switch of claim 1 wherein said first and second compound polarization rotators comprise a 45° Faraday rotator, and said Faraday rotator is coupled to electromagnets.

6. The optical switch of claim 1 wherein said first and second compound polarization rotators comprise an electro-optic retarder.

7. The optical switch of claim 1 wherein said first and second compound polarization rotators comprise a 90° Faraday rotator assembly comprising:
   a) a first thin plate Faraday rotator formed of an optically transparent magnetic material and arranged for passing light beams along a path in a direction perpendicular to said thin plate;
   b) means for applying a magnetic field in said light beam direction to said thin plate Faraday rotator, whereby the angle of polarization rotation of said thin plate Faraday rotator is reversed by reversing the direction of the magnetic field;
   c) a second thin plate Faraday rotator located along the said beam path and formed of an optically transparent magnetic material and arranged for passing light beams in a direction perpendicular to said second thin plate, wherein the magnetization of said second thin plate is maintained in a saturation state along said beam direction.

8. The optical switch of claim 1 wherein said polarization-dependent beam path deflector comprises a Wollaston prism.

9. The optical switch of claim 1 wherein said polarization-dependent beam path deflector comprises a birefringent walk-off element.

10. The optical switch of claim 1, wherein said optical path is reciprocal.

11. The optical switch of claim 1, wherein said optical path is non-reciprocal.

12. The optical switch of claim 4 wherein said first and second blocks of birefringent material, said beam deflector, and said tapered plates comprise a material selected from the group consisting of rutile, calcite, and yttrium orthovanadate.

13. The optical switch of claim 5 wherein said first and second compound polarization rotators are selected from a class of garnet materials characterized by having a saturation field of less than 500 Oe.

14. The optical switch of claim 6 wherein said first and second compound polarization rotators are selected from a class of ferroelectric materials characterized by having a Curie temperature of less than about 600° C.

15. The optical switch of claim 6 wherein said first and second compound polarization rotators are selected from a class of organic materials characterized by having a Vπ of less than about 600V.

16. The optical switch of claim 7, wherein said first thin plate Faraday rotator is selected from a class of garnet materials characterized by having a saturation field of less than 500 Oe.

17. The optical switch of claim 7, wherein said first and second thin plate Faraday rotators are a 45° Faraday rotator.

18. The optical switch of claim 7, wherein said magnetic field applying means is formed by a coil and an electromagnet formed of semi-hard magnetic material.

19. The optical switch of claim 7, wherein said second Faraday rotator comprises a latching garnet plate.

20. The optical switch of claim 7, wherein said second Faraday rotator comprises a garnet plate and a permanent magnet.

* * * * *